United States Patent
Palata

(10) Patent No.: US 6,836,128 B2
(45) Date of Patent: Dec. 28, 2004

(54) INDUCTIVE FLOW SENSOR FOR DETERMINING THE POSITION OF FLOWING ELEMENTS AND METHOD OF DETERMINING THE POSITION OF FLOW

(75) Inventor: Jaromir Palata, Friedrichshafen (DE)

(73) Assignee: i f m electronic GmbH, Essen (DE)

(*) Notice: Subject to any disclaimer, the term of this patent is extended or adjusted under 35 U.S.C. 154(b) by 347 days.

(21) Appl. No.: 10/183,052

(22) Filed: Jun. 27, 2002

(65) Prior Publication Data

US 2003/0034785 A1 Feb. 20, 2003

(30) Foreign Application Priority Data

Jun. 27, 2001 (DE) .......................... 101 30 572

(51) Int. Cl.$^7$ .............................. G01R 27/28
(52) U.S. Cl. ...................... 324/655; 324/654
(58) Field of Search ............... 324/655, 654, 324/674, 675

(56) References Cited

U.S. PATENT DOCUMENTS

| | | | | | |
|---|---|---|---|---|---|
| 4,075,551 | A | * | 2/1978 | Zabler | 324/207.16 |
| 4,991,301 | A | * | 2/1991 | Hore | 33/366.25 |
| 6,744,263 | B2 | * | 6/2004 | Amini | 324/644 |
| 2003/0206007 | A1 | * | 11/2003 | Gass et al. | 324/207.17 |

FOREIGN PATENT DOCUMENTS

| | | | |
|---|---|---|---|
| DE | 31 02 439 A1 | 8/1982 | |
| DE | 32 45 501 A1 | 6/1984 | |
| DE | 34 23 977 A1 | 1/1985 | |
| DE | 32 44 891 A1 | 3/1987 | |
| DE | 42 13 866 A1 | 10/1992 | |
| DE | 42 32 426 A1 | 4/1993 | |
| DE | 43 37 208 A1 | 5/1995 | |
| DE | 196 32 211 A1 | 2/1998 | |
| DE | 10022821 A1 * | 11/2001 | ............ G01B/7/02 |
| EP | 875734 A1 * | 11/1998 | ............ G01D/5/20 |
| SU | 478175 A * | 8/1975 | ............ G01B/7/00 |

* cited by examiner

Primary Examiner—Charles H. Nolan, Jr.
(74) Attorney, Agent, or Firm—Nixon Peabody LLP; David S. Safran

(57) ABSTRACT

An inductive path sensor for determining the position of the influencing element (2) is described, with several coils (4) arranged in succession, with one capacitor (5), with an amplifier element (6), with at least one changeover switch (7) and with an evaluation unit (8), one coil (4) at a time and a capacitor (5) forming an oscillating circuit, and one oscillating circuit and the amplifier element (6) forming an oscillator (9), the individual coils (4) being chosen in succession by the changeover switch or switches (7) and the evaluation unit (8) measuring the change of impedance of the coil (4) chosen by the changeover switch (7) or of the oscillating circuit chosen by the changeover switch (7) depending on the position of the influencing element (2) relative to the respective coil (4).

26 Claims, 9 Drawing Sheets

Figure 1:
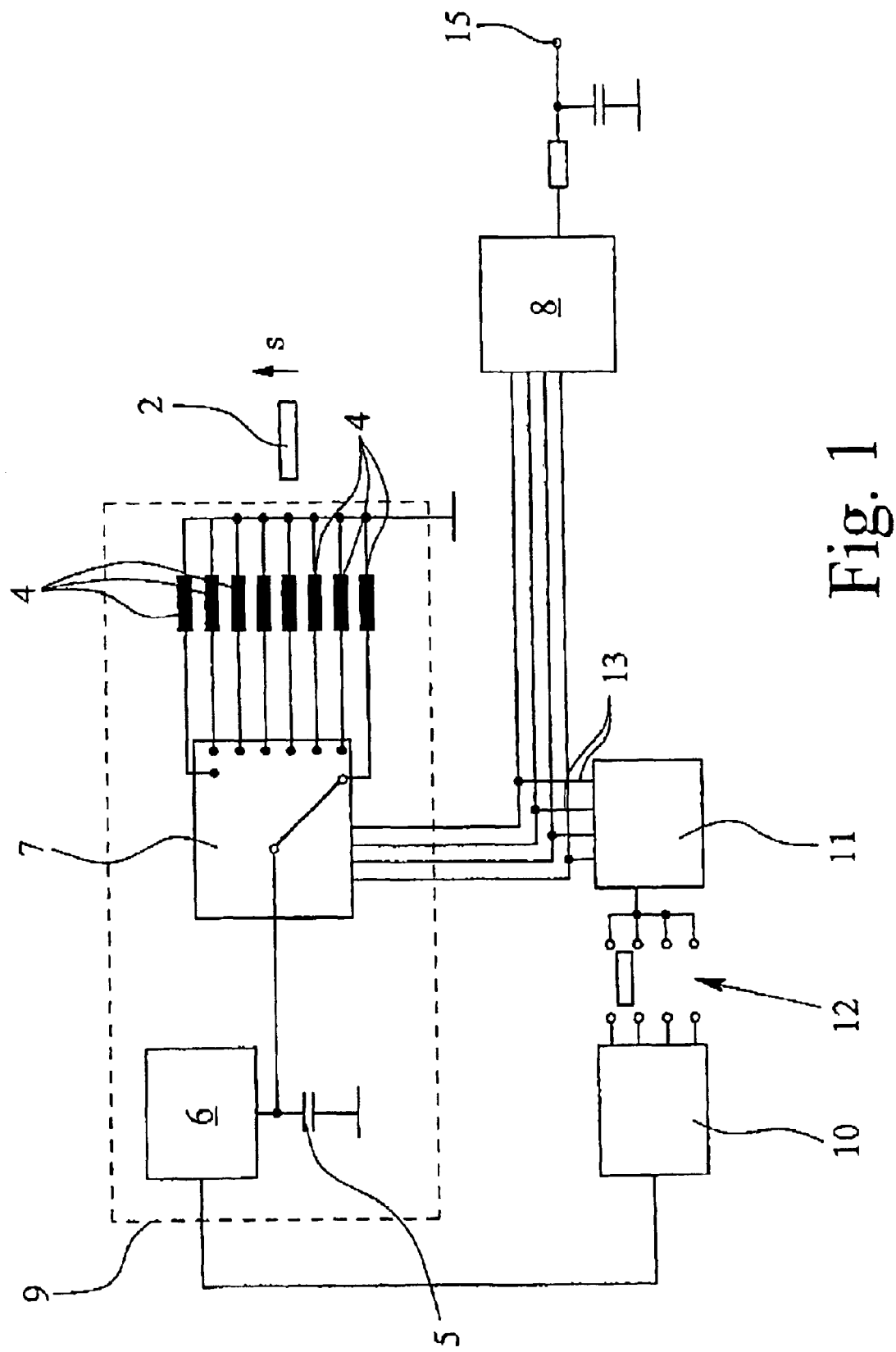

INDUCTIVE FLOW SENSOR FOR DETERMINING THE POSITION OF FLOWING ELEMENTS AND METHOD OF DETERMINING THE POSITION OF FLOW

The invention relates to an inductive path sensor, for example a valve sensor, for determining the position of an influencing element, for example a valve rod or piston, and a process for determining the position of an influencing element with an inductive path sensor.

Path sensors for determining the position of an influencing element, which are often also called position sensors, are known in a host of embodiments and for a host of applications. These path sensors can on the one hand be classified according to whether the motion of the influencing element to be monitored is primarily linear motion, thus a distance is to be acquired by the path sensor, or the motion of the influencing element is first of all circular motion, so that the path sensor monitors or establishes the angle of rotation of the influencing element. Path sensors which detect an angle of rotation are often also called angular resolvers.

In addition, path sensors can also be classified according to their physical operating principle. For example, inductive, capacitive or optoelectronic path sensors are known.

The subject matter of this invention is an inductive path sensor, especially one with which linear motion of an influencing element, for example a distance, can be measured. These known inductive path sensors have several coils, of which at least one coil is made as the primary coil and at least another coil is made as a secondary coil. The coils are generally built according to the transformer principle, so that one secondary coil is located laterally adjacent to one primary coil at a time. The inductive coupling between the middle primary coil and the two laterally arranged secondary coils is changed by the position of the influencing element which is located in the area of the cylinder axis of the cylindrical coil system and is made for example as a magnetically conductive rod. These inductive path sensors are known from DE 43 37 208 A1 and DE 19632 211 A1.

But in the known inductive path sensors it is a disadvantage that on the one hand the structural length of the path sensor is distinctly longer than the maximum distance of the influencing element which can be monitored, so that at a give path length to be monitored a path sensor up to 100% longer is required. This is undesirable especially where only a limited installation space is available. On the other hand, in the known inductive path sensors the attainable measurement accuracy is often not sufficient or it can only be increased by increased circuitry cost.

Thus, the object of this invention is to make available an inductive path sensor which has a structural length as small as possible and in addition enables measurement accuracy as high as possible. In addition, the object of this invention is also to devise a process with which the position of the influencing element can be precisely and reliably acquired within a housing by means of an inductive path sensor.

The aforementioned object is achieved as claimed in the invention by an inductive path sensor with several coils arranged in succession, with at least one capacitor, with at least one amplifier element, with at least one changeover switch and with an evaluation unit, one coil at a time and the capacitor or a capacitor forming an oscillating circuit, and one oscillating circuit and the amplifier element or an amplifier element forming an oscillator, the individual coils and the individual oscillators being chosen in succession by the changeover switch and the evaluation unit measuring the change of impedance of the coil chosen by the changeover switch or of the oscillating circuit chosen by the changeover switch depending on the position of the influencing element relative to the respective coil.

By using several successive coils, the coils being located in succession in the direction of the position of the influencing element to be ascertained, and the evaluation unit measuring the change of impedance of each coil and each oscillating circuit in succession depending on the position of the influencing element by the changeover switch, an inductive path sensor can be implemented with a structural length which is only slightly greater than the total length of the distance to be monitored.

It was stated above that the evaluation unit measures the change of the impedance of each coil or each oscillating circuit. Preferably the evaluation unit measures the change of the frequency of each coil or each oscillating circuit depending on the position of the influencing element. But in addition it is also possible for the evaluation unit to measure the change of the inductance of the coil or of the oscillating circuit or the change of the amplitude of the oscillating circuit as a function of the position of the influencing element.

If according to the preferred embodiment of the invention the evaluation unit measures the change of frequency, generally the change of frequency of the oscillating circuit is measured depending on the position of the influencing element. But at least theoretically it is also possible for the change of the frequency to be measured solely by the coil, inasmuch as each actual coil in addition to the primarily characteristic inductance also has an ohmic resistance and several parasitic capacitances. Thus the actual coil has a natural resonant frequency which is determined by the inductance and the parasitic capacitances of the coil. But generally the change of frequency of the oscillating circuit consisting of a coil and an additional capacitor is measured by the evaluation unit.

According to one preferred embodiment of the invention, each oscillating circuit has the same, especially the identical capacitor, and each oscillator has the same, especially the identical amplifier element. In other words, the inductive path sensor does have several successive coils, but only one capacitor and also only one amplifier element, for example an operational amplifier. The individual oscillating circuits thus each consist of the same capacitor and a coil chosen by the changeover switch. This has first of all the advantage that only a few components are required for the inductive path sensor, by which it can be built both economically and also with a further reduced structural size. In addition, when the individual oscillators are each composed of the same capacitor and the same amplifier element, measurement signal adulterations due to component variations do not occur, as would be the case when using several capacitors or several amplifier elements.

If it was stated above that the inductive path sensor according to one preferred embodiment has only one capacitor and only one amplifier element, it is of course only meant that the individual coils are always interconnected via the changeover switch to the same capacitor or to the same amplifier element, by which a number of oscillators corresponding to the number of coils is accomplished. Of course it is also possible for the amplifier element to be implemented in terms of circuitry by two or more amplifier elements, for example by two operational amplifiers. Likewise the capacitor of the oscillating circuit can be implemented in terms of circuitry by several capacitors.

Influencing the coil or the oscillating circuit depending on the position of the influencing element is theoretically based on three different physical effects which differ greatly in their action, depending on what type of influencing element is used.

Within the framework of this invention the influencing of the impedance of the oscillating circuit by the influencing element based on the transformer principle is preferably evaluated. The physical effect called the transformer principle here is based on that coil of the oscillating circuit generating an alternating electromagnetic field which induces a voltage in the adjacent body—the influencing element—first of all according to Faraday's Law. When using an influencing element of a material with relatively high conductivity the induced voltage leads to current flow in the influencing element. This current resulting from the "secondary" voltage induced in the influencing element results for its part in an alternating electromagnetic field which is opposite the "primary" alternating electromagnetic field, i.e. opposite the alternating electromagnetic field generated by the coil. This opposite "secondary" alternating electromagnetic field causes a reduction of the inductance and thus an increase of the frequency of the oscillating circuit. Preferably this frequency increase is measured and evaluated depending on the position of the influencing element by the evaluation unit.

The second physical effect which occurs when the impedance of the oscillating circuit is influenced by the influencing element is the influencing of the magnetic resistance of the magnetic circuit. If there is no influencing element in the vicinity of the coil, the magnetic resistance is determined solely by the air and is thus very large. If there is an influencing element of a preferably ferromagnetic material in the vicinity of the coil, in this way the electromagnetic resistance of the magnetic circuit is reduced; this can be established on the reduction of the frequency of the oscillating circuit.

The third physical effect which occurs when the impedance of the oscillating circuit is influenced by the influencing element is the "genuine" damping of the oscillating circuit by withdrawing energy from the alternating electromagnetic field of the oscillating circuit as a result of eddy current losses in the influencing element. This physical effect which is called "genuine" damping here is evaluated generally in inductive proximity switches.

Since theoretically all three effects are active, provisions must be made for the two effects which are not to be used for evaluation to be negligibly small compared to the effect which is to be used for evaluation.

If the transformer effect is used for evaluation, as is preferable, this transformer effect should not be counteracted by the fact that the resistance of the magnetic circuit and thus the frequency are reduced by the ferromagnetic material. Preferably the influencing is evaluated based on the transformer principle, because in this way it can be guaranteed by the suitable choice of the frequency that the measurement results are essentially independent of the material of the influencing element used. The ferromagnetic effect can remain ignored. The frequency of the uninfluenced oscillating circuit to be chosen for this purpose is preferably above 500 kHz, for example between 500 kHz and 10 MHz.

With regard to the manner in which a change of the impedance of the oscillating circuit chosen by the changeover switch is measured and evaluated by the evaluation unit, there are several different possibilities known to one skilled in the art which differ among others in the complexity of the evaluation unit. Generally the evaluation unit has at least one microprocessor in which the measured values can be processed, converted and optionally stored in an additional memory.

If according to the preferred embodiment of the invention the change of frequency of the influencing element is measured by the oscillating circuit, the inductive path sensor as claimed in the invention advantageously has at least one counter which on the one hand is connected to the oscillator and on the other hand to the evaluation unit. According to a first preferred embodiment, the counter counts the number of oscillations until a preset value is reached and the evaluation unit measures the time which passes until the counter has reached this preset value. Here it is especially advantageous that time measurement with the evaluation unit, for example a microprocessor, can be accomplished very easily. If the transformer principle is used so that the presence of the influencing element in front of the selected coil increases the frequency of the oscillating circuit, in the above described type of evaluation this is established by the fact that the counter reaches the preset value faster, compared to the state in which the coil and thus the oscillating circuit are not influenced by the influencing element. The evaluation unit thus measures a time which is shorter compared to the uninfluenced state.

In one alternative embodiment the counter counts the number of oscillations of the oscillator during a given time interval and this number is evaluated by the evaluation unit.

According to another advantageous embodiment of the invention the inductive path sensor has a second counter which is connected on the one hand to the first counter and on the other to the evaluation unit and the changeover switch. The second counter generates addresses, preferably in dual code, which are increased by one each time, starting with one, when the first counter has reached the preset value or has counted the given time interval. Because the second counter is connected to the changeover switch, the changeover switch is switched by the address produced by the second counter and thus the next coil is selected. By connecting the two counters in succession the changeover switch is switched and the next coil is selected automatically at the correct and at the same time fastest possible instant, by which the reaction speed of the inductive path sensor is increased.

For the inductive path sensor as claimed in the invention, basically any number of different types of coils can be used. With respect to component cost and evaluations it is however practicable if for example 8, 16 or 32 coils are used, which are selected accordingly with one, two or four 1 out of 8 multiplexers. These 1 out of 8 multiplexers are commercially common and are therefore available relatively economically.

The individual coils are each made preferably identically and can be formed for example as hollow cylindrical coils or as flat coils. The individual coils are also preferably arranged symmetrically to one another. If the coils are made as hollow cylindrical coils, the influencing element is located movably along the cylinder axis of the coils, for example within a tube. The influencing element is then preferably likewise made cylindrically, for example disk-shaped, or rod-shaped.

According to a last advantageous embodiment of the inductive path sensor as claimed in the invention which is to be briefly explained here, the individual coils are made or arranged such that they are decoupled among one another.

If the individual coils are located relatively close to one another, which is generally the case as a result of the desired short structural length of the inductive path sensor, there is relatively great electromagnetic coupling which has an adverse effect on the measurement result between adjacent coils. The coil which has not been selected by the changeover switch according to the preferred embodiment is not connected to a separate capacitor so that this coil has only its parasitic capacitances which were mentioned initially. Since these parasitic capacitances are much smaller than the capacitance of the capacitor of the oscillating circuit, a coil which has not been selected has a higher natural resonant frequency. Due to the greater ratio of inductance to capacitance the coil which was not selected also has a clearly higher quality than the coil which was just selected by the changeover switch and which is connected to the capacitor of the oscillating circuit. In a small frequency range this leads suddenly to frequency guidance of the oscillator by the coil which was not selected, by which the frequency of the oscillator is detuned and thus the measurement signal erroneously reproduces the actual position of the influencing element.

To prevent or attenuate this unwanted coupling between adjacent coils, there are now various possibilities for decoupling the individual coils among one another. The first preferred embodiment of the inductive path sensor as claimed in the invention consists in that the individual coils are each located in a pot-type core, the pot-type cores being open toward the influencing element. The use of pot-type cores which are known for example in inductive proximity sensors and which consist of a material with a permeability as high as possible is especially suited when hollow cylindrical coils are used.

The use of these pot-type cores in addition to the primarily desired decoupling of the adjacent coils advantageously also causes alignment of the electromagnetic field in the direction of the cylinder axis of the coils and thus in the direction of an influencing element located in front of the coil. In this way the available useful signal is increased. In addition, shielding of the inductive path sensor to the environment takes place by using pot-type cores so that on the one hand no electromagnetic fields are emitted into the vicinity by the inductive path sensor, on the other hand interference of the measurement signal by articles located in the vicinity of the inductive path sensor, especially metal articles, is prevented.

Alternatively to the use of pot-type cores, the individual cores can also be decoupled among one another by the coils being located on a flexible carrier of a ferrite-polymer composite, by the corresponding folding of the flexible carrier or parts of the flexible carrier the individual coils being shielded against one another. In addition or besides, it is also possible to separate the individual coils from one another by short-circuiting rings.

The initially mentioned object is achieved in a process for determining the position of the influencing element with an inductive path sensor with several successive coils, with at least one capacitor, with at least one amplifier element, with at least one changeover switch and an evaluation unit first of all and essentially by the process having the following steps:

Selection of a coil or an oscillator by the changeover switch,

Measurement of the impedance of the coil selected by the changeover switch and of the oscillating circuit selected by the changeover switch by the evaluation unit as a function of the position of the influencing element relative to the coil, the aforementioned steps being repeated until the impedance of all coils has been measured by the evaluation unit.

This process can preferably be carried out with the above described inductive path sensor.

Preferably the process as claimed in the invention for determining the position of the influencing element, for example of a piston, is carried out with an inductive path sensor which has a first counter and second counter. The first counter is on the one hand connected to the oscillator and on the other to the evaluation unit and the second counter is connected on the one hand to the first counter and on the other to the evaluation unit and the changeover switch.

The first counter which counts the number of oscillations of the just selected oscillator, when a preset value is reached, delivers a pulse to the second counter, the second counter producing addresses which are increased by one each time, starting with one, when the second counter receives the pulse from the first counter. The address which is preferably produced in dual code causes first the commutation of the changeover switch. In addition, the evaluation unit receives from the address produced by the second counter on the one hand the information which coil has been selected by the changeover switch, on the other hand the information how long the respective address is present, and thus the information how long the first counter needed to reach the preset value when counting the oscillations of the oscillator. This time interval, as already cited, is a measure for influencing the frequency of the oscillating circuit and thus a measure for the position of the influencing element.

The time interval for which the respective address is present can be determined especially easily by the evaluation unit by the evaluation unit measuring the time between the high/low flanks at the lowest order output of the second counter. The address of the second counter which is present in dual code is thus used as the gate time for the evaluation unit.

According to a last advantageous embodiment of the process as claimed in the invention which is to be briefly described here, in the calibration process the influencing element is moved over the maximum measurable length of the inductive path sensor and the values obtained during the calibration process are stored as correction and reference values in the evaluation unit and in an additional storage. In this way it is possible to use different influencing elements with different dimensions or of different materials. Component tolerances of the inductive path sensor or changes as a result of temperature fluctuations can be compensated by this calibration process.

In particular there is now a plurality of possibilities for embodying and developing the inductive path sensor as claimed in the invention and the process as claimed in the invention for determining the position of the influencing element with an inductive path sensor. These embodiments and developments follow from the claims subordinate to claim 1 and claim 18 and from the following description of preferred embodiments in conjunction with the drawings.

Figure 2:
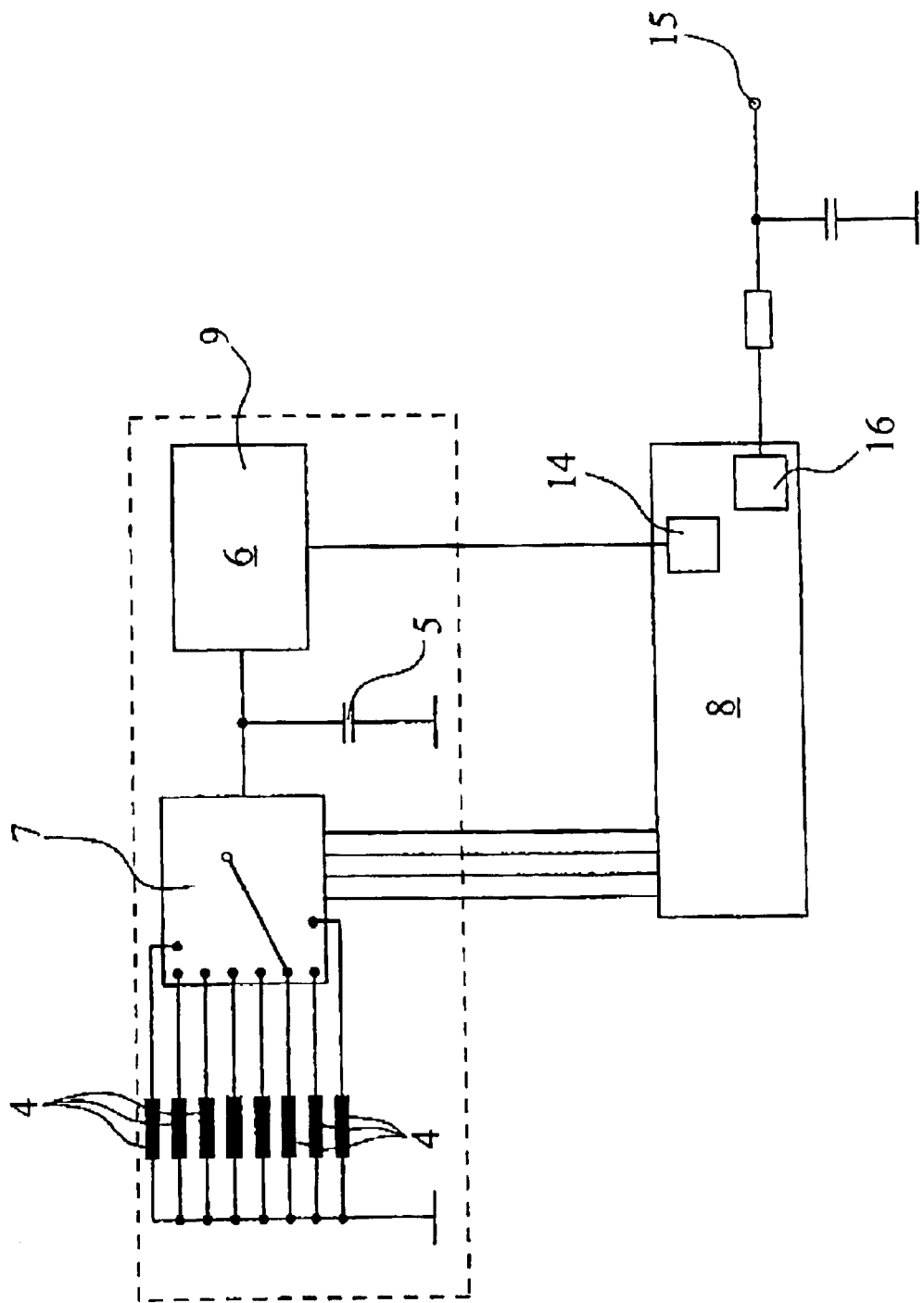
Figure 3:
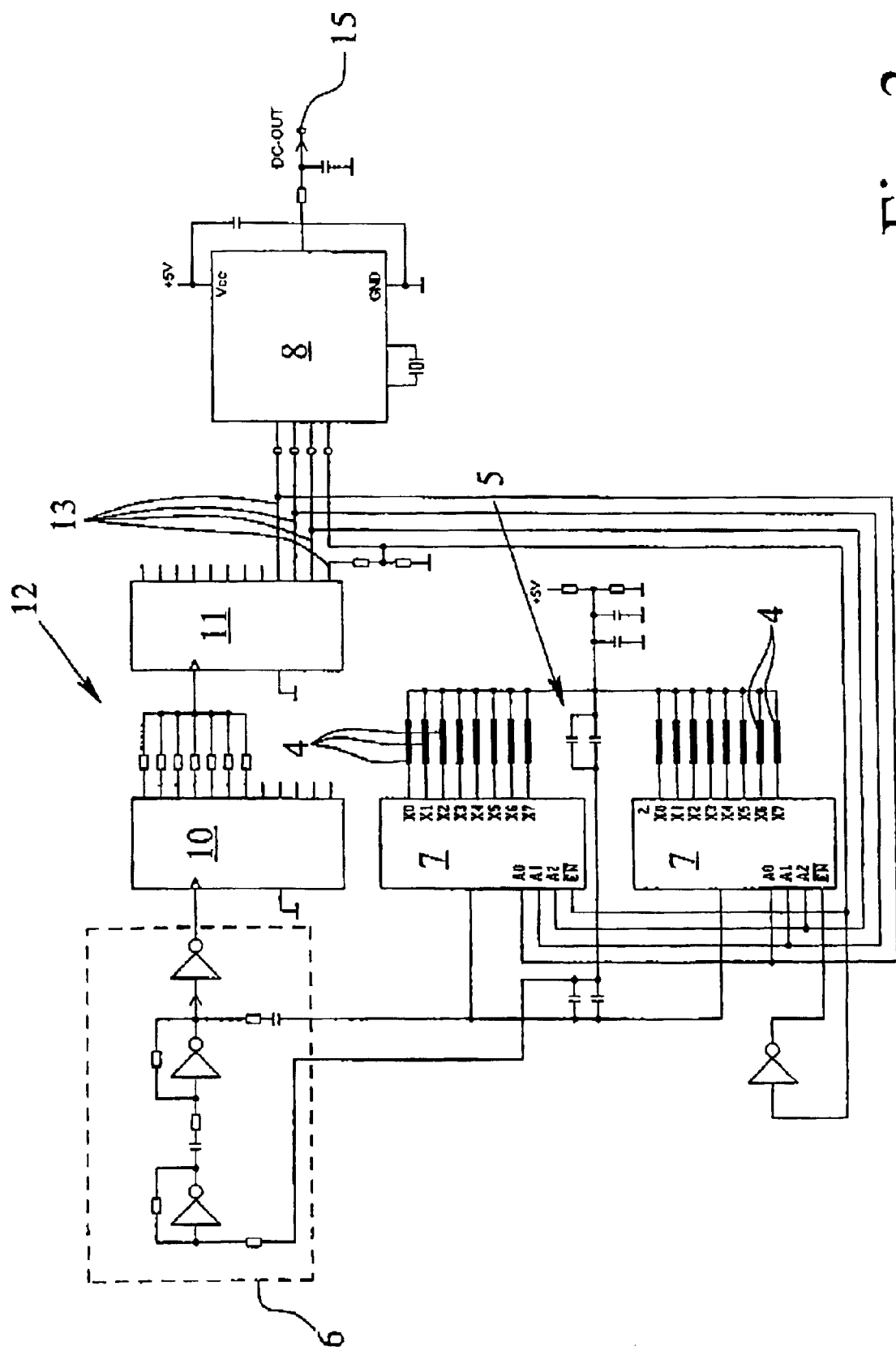
Figure 4:
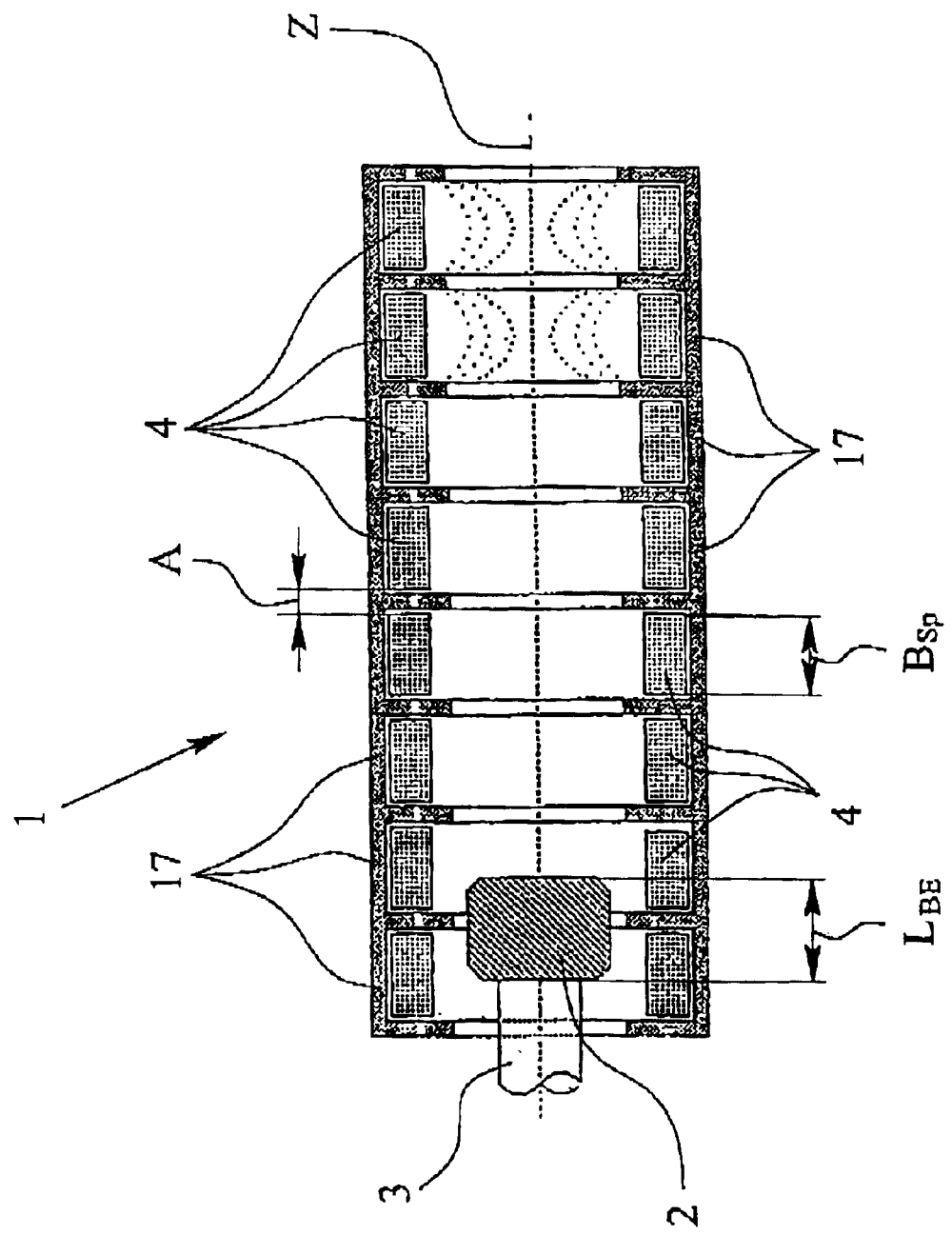
Figure 5:
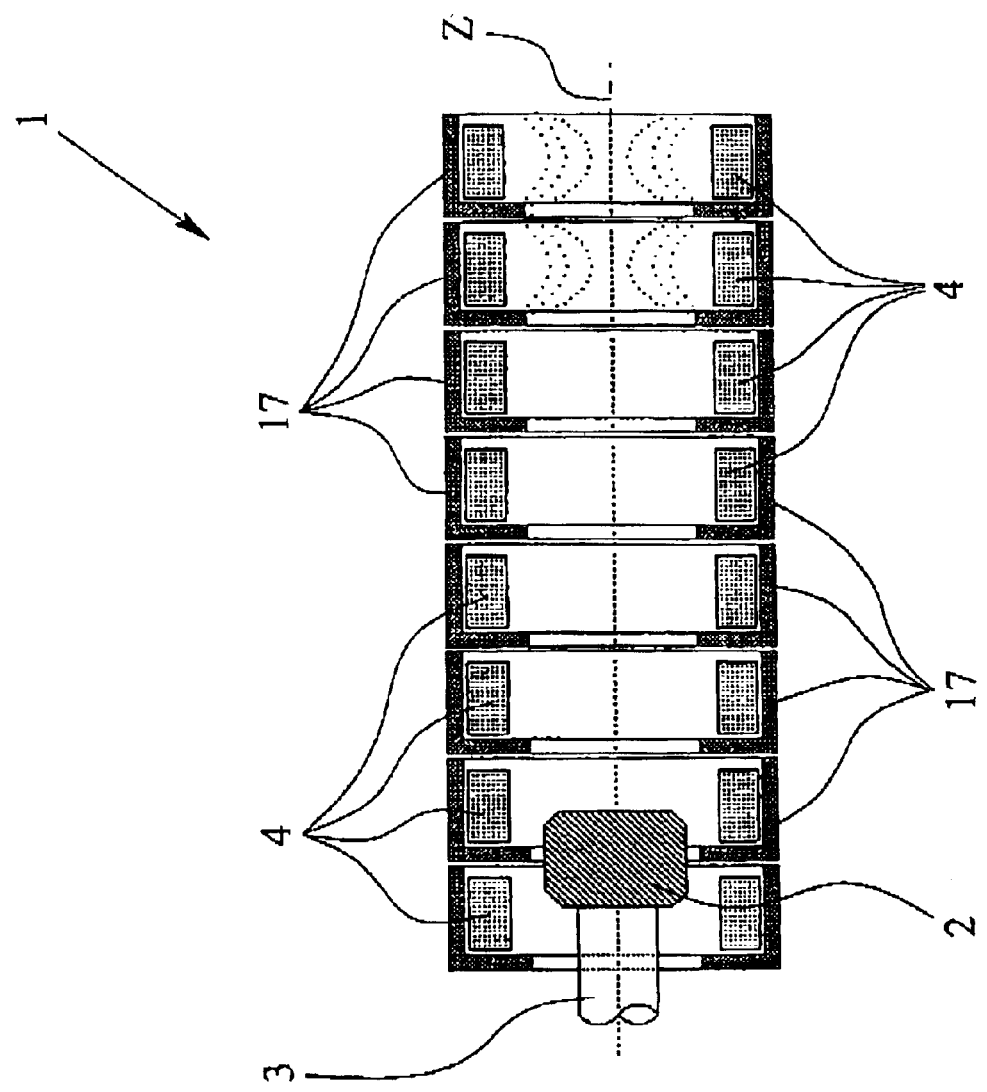
Figure 6:
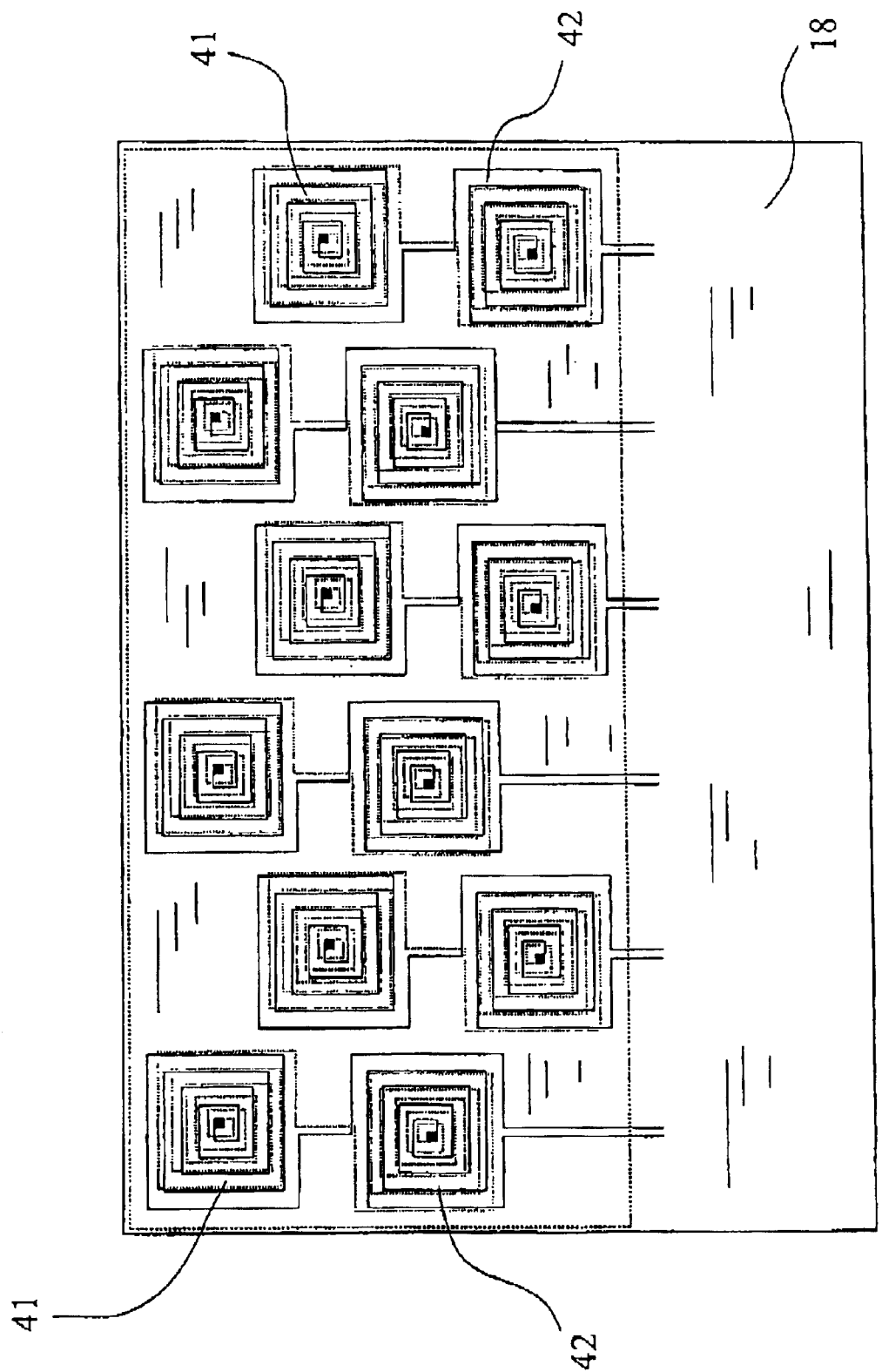
Figure 7A:
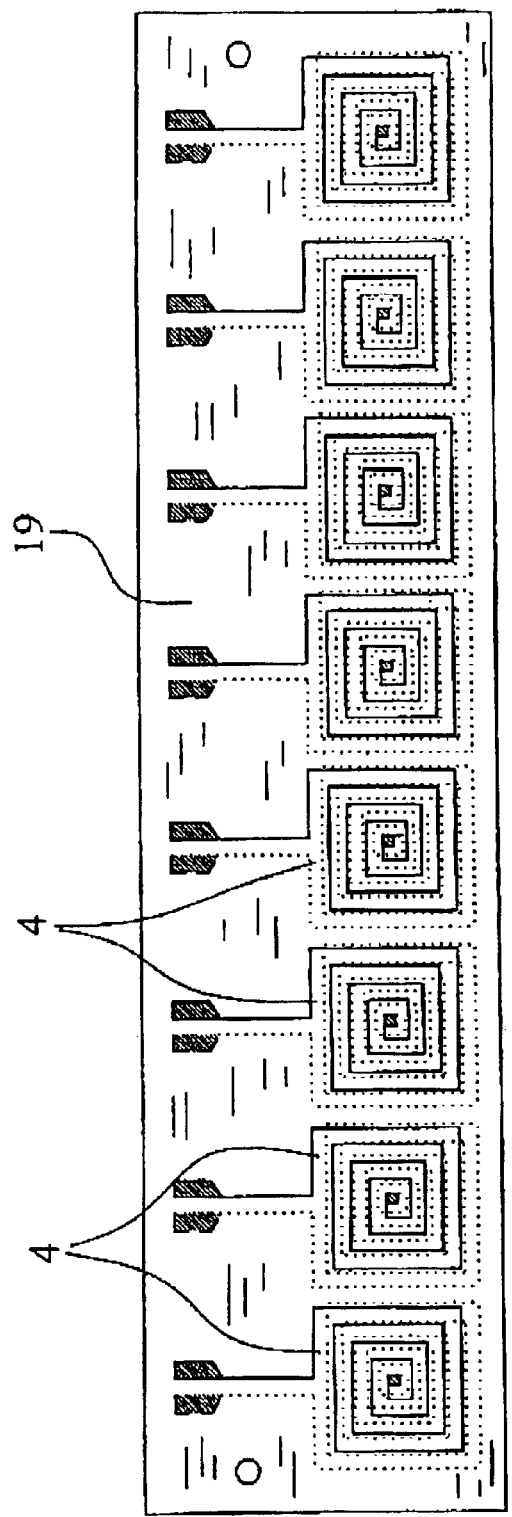
Figure 7B:
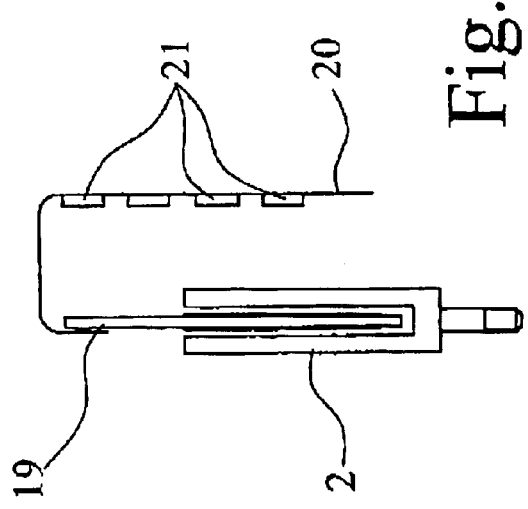
Figure 8:
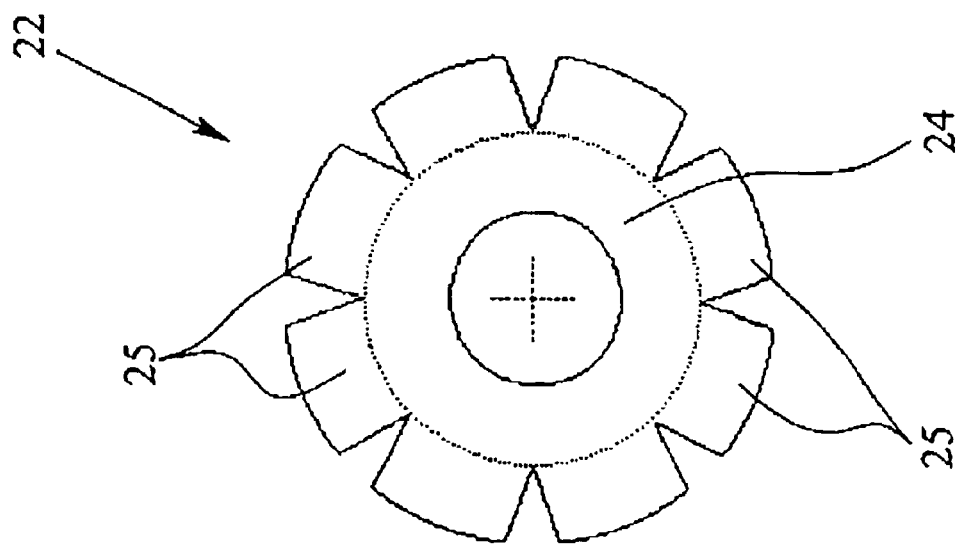
Figure 8:
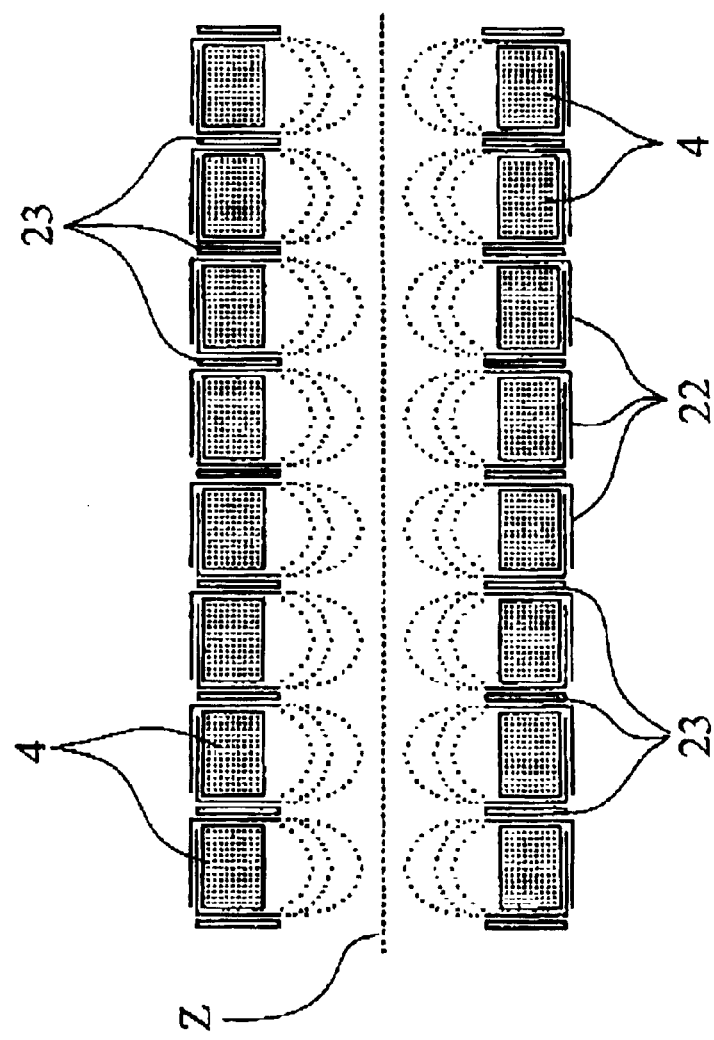

FIG. 1 shows a schematic of a circuit structure of an inductive path sensor according to the first embodiment of the invention, FIG. 2 shows a schematic of a circuit structure of an inductive path sensor according to the second embodiment of the invention, FIG. 3 shows the circuit structure of an inductive path sensor according to the first embodiment of the invention, FIG. 4 shows a first embodiment of an inductive path sensor as claimed in the invention, FIG. 5 shows a second embodiment of an inductive path sensor as claimed in the invention, FIG. 6 shows an arrangement of several coils of an inductive path sensor made as flat coils, on a flexible carrier, FIG. 7 shows another arrangement of several coils of an inductive path sensor made as flat coils, on a carrier, FIG. 8 shows an arrangement of several hollow cylindrical coils of an inductive path sensor, the individual coils each being located on a flexible carrier, and a representation of one such flexible carrier and FIG. 9 shows several measurement curves of the individual coils of an inductive path sensor depending on the position of the influencing element for a rod-shaped influencing element and for a disk-shaped influencing element.

The figures show an inductive path sensor 1 for determining the position of the influencing element 2 only in FIGS. 4 and 5, here too the inductive path sensor 1 being only incompletely shown, especially the housing which holds the inductive path sensor 1 not being shown. The influencing element 2 is located at the end of one rod 3 which consists of a material which does not influence the impedance of the coils, for example of plastic.

In the inductive path sensor 1 as claimed in the invention just as in the process as claimed in the invention for determining the position of the influencing element 2 with an inductive path sensor 1, the external configuration of the inductive path sensor 1 is less important than the circuit structure of the inductive path sensor 1 and the arrangement and execution of the individual coils 4 of the inductive path sensor 1.

FIG. 1 schematically shows the circuit structure of an inductive path sensor 1 according to a first preferred embodiment of the invention. One specific circuit structure of one such inductive path sensor 1 is shown in FIG. 3. Both in the schematic as shown in FIG. 1 and also in the detailed representation as shown in FIG. 3 only the important components as claimed in the invention and components according to one preferred embodiment of the invention are shown, but not all electrical or electronic components of the inductive path sensor 1. Both FIG. 1 and also FIG. 3 show that the inductive path sensor 1 has several successive coils 4—in the embodiment as shown in FIG. 1 a total of eight and in the embodiment as shown in FIG. 3 a total of 16 coils 4—a capacitor 5, an amplifier element 6, at least one changeover switch 7 and an evaluation unit 8. The coils 4 are located in succession in the direction of the position s of the influencing element 2 to be determined, as is shown using FIGS. 4 and 5.

As the changeover switch 7 with a total of eight coils 4 one 1 out of 8 multiplexers is used or for a total of 16 coils 4 two 1 out of 8 multiplexers 1 are used. The changeover switch 7 connects one coil 4 at a time to the capacitor 5 so that the coil 4 selected by the changeover switch 7 and the capacitor 5 form an oscillating circuit. Together with the amplifier element 6 the oscillating circuit then forms an oscillator 9 with a resonant frequency determined by the inductance of the coil 4 and the capacitance of the capacitor 5. At this point the change of frequency of the oscillator 9 or of the oscillating circuit for each coil 4 is evaluated as a function of the position of the influencing element 2.

In the embodiments as shown in FIGS. 1 and 3, the evaluation unit 8 measures the change of the frequency of the oscillator 9, while in the embodiment as shown in FIG. 2 the evaluation unit 8 evaluates the change of amplitude of the oscillator 9 as a function of the position of the influencing element 2.

The preferred evaluation of the frequency change takes place in that the inductive path sensor 1 has a first counter 10 and a second counter 11. The first counter 10 is on the one hand connected to the oscillator 9 and on the other via an adjustable resistance bridge 12 to the second counter 11. The second counter 11 is on the one hand, as stated above, connected to the first counter 10, on the other both to the changeover switch 7 and the evaluation unit 8.

The first counter 10 counts the number of oscillations of the oscillator 9 up to a value which can be adjusted via the resistance bridge 12. When the first counter 10 has reached this preset value, it delivers a pulse to the second counter 11. The second counter 11 produces an address which begins at one and which is increased by one each time when the second counter 11 receives the pulse from the first counter 10. Because the second counter 11 is connected to the changeover switch 7, a change of the address by the second counter 11 also causes commutation of the changeover switch 7, by which it is ensured that the measurement of the next coil 4 begins exactly when the preset number of oscillations of the oscillator 9 on the first counter 10 has been reached with the previous coil 4.

The second counter 11 has a total of four outputs 13 so that a total of 16 addresses in dual code can be displayed by the second counter 11. The evaluation unit 8 which is likewise connected to the second counter 11 receives from the current address on the one hand the information which coil 4 has been selected by the changeover switch 7, measures on the other hand the time interval for which the respective address is present. To do this the time between the high/low flanks at the lowest order output 13 of the second counter 11 is measured. This time corresponds to the time which the first counter 10 needs until it has reached the preset value.

When the frequency of the oscillator 9 is influenced by the influencing element 2 approaching the coil 4 which has just been selected by the changeover switch 7 and when the transformer effect is evaluated the frequency of the oscillating circuit consisting of the selected coil 4 and the capacitor 5 or the frequency of the oscillator 9 is increased so that the counter 10 reaches the preset value within a shorter time, each time compared to the state in which the influencing element 2 is so far away from the selected coil 4 that it does not influence the latter.

At a resonant frequency of the uninfluenced oscillating circuit formed by the coil 4 and the capacitor 5 of 0.5–10 MHz, the frequency difference and thus also the time difference measured by the evaluation unit 8 between the completely uninfluenced and the maximally influenced state of the coil 4 are roughly 20–30%. If the resonant frequency of the uninfluenced oscillating circuit is 500 kHz and a value of 5000 is set on the first counter 10, the first counter 10 for a completely uninfluenced coil 4 needs only 10 ms to reach the preset value. For an inductive path sensor 1 with a total of 16 successive coils 4 thus only a total of roughly 160 ms are needed until all coils 4 have been interrogated and thus the position of the influencing element 2 has been ascertained.

In a circuit structure of an inductive path sensor 1 as shown in the schematic in FIG. 2, the evaluation unit 8 measures the change of the amplitude of each oscillator 9 so that here no counters are necessary. Conversely the evaluation unit 8 made as a microprocessor must have at least one analog/digital converter 14, and if the output signal 15 is to be output analogously, also a digital/analog converter 16. The changeover switch 7 is switched directly by the evaluation unit 8.

FIGS. 4 and 5 each show one embodiment of an inductive path sensor 1, especially the arrangement of eight coils 4 at a time to one another. The coils 4 are made as hollow cylindrical coils 4 so that then the influencing element 2 along the cylinder axis Z of the coils 4 is movably arranged. To decouple the individual coils 4 among one another they are each located in a pot-type core 17, the pot-type core 17 being open towards the influencing element 2, i.e. toward the cylinder axis Z. The individual pot-type cores 17 can be made U-shaped (FIG. 4) or L-shaped (FIG. 5) in cross section. The individual pot-type cores 17 can be made in one part or two parts or all pot-type cores 17 can be made in one piece overall and thus tubular. One such tube which forms the individual pot-type cores 17 can be produced for example from a sprayed plastic with ferrite powder.

FIG. 6 shows an arrangement of several coils 4 of an inductive path sensor 1 on a flexible carrier 18 which is implemented here by a foil or conductive film. The coils 4 are made as flat coils and etched onto the flexible carrier 18. The coils 4 are etched on both sides onto the flexible carrier 18; this is indicated by the broken-line representation of the coil paths in FIG. 6. In this way the number of turns of the individual coils 4 can be doubled, by which a number of turns between 50 and 100 is attainable. Each coil 4 consists of two component coils 41, 42 which lie opposite one another in the wound state of the flexible carrier 18. Successive coils 4 or component coils 41, 42 are each located offset to one another such that the successive coils 4, when the flexible carrier 18 is wound onto a tube, are located each turned 90° to one another. In this way decoupling of the individual coils 4 among one another is implemented. If the flexible carrier 18 consists of a ferromagnetic material, for example, of a ferrite-polymer composite film, in this way on the one hand the decoupling of the individual coils 4 is further intensified among one another, on the other hand shielding of the inductive path sensor 1 relative to the environment takes place so that no electromagnetic fields which have been produced by the coils 4 are emitted into the environment.

One alternative arrangement of several coils 4 made flat on a rigid circuit board 19 is shown in FIG. 7*a*. The coils 4 are etched both on the front and also the back of the circuit board 19 and each have 30 turns. Besides the rectangular coil paths shown here, for example also round coil paths are possible. When using a rigid carrier in the form of a circuit board 19 the influencing element 2, as shown in FIG. 7*b*, can be made U-shaped or fork-shaped. Since the coils 4 are located both on the front and also the back of the circuit board 19, a larger useful signal arises with an influencing element 2 which is made U-shaped or fork-shaped. The circuit board 19 is connected to a conductive film 20 on which other components 21 of the inductive path sensor 1 are located.

FIG. 8 shows an arrangement of several hollow cylindrical coils 4, in contrast to FIGS. 4 and 5 decoupling between the individual coils 4 taking place, not by the pot-type cores 17, but by films 22 of a ferrite-polymer composite and by copper foils 23 forced as perforated disks. The copper foils 23 are located each between two adjacent coils 4 which are each located on the films 22. The films 22 have a base surface 24 and several areas 25 which are separated from one another by slots and which can be folded around the coils 4.

Figure 9A:
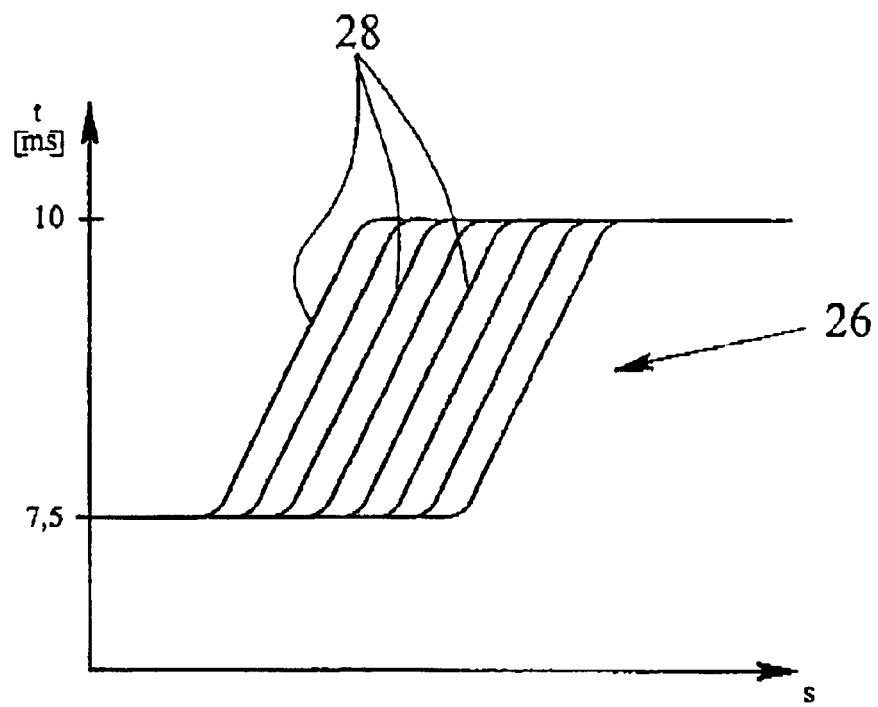
Figure 9B:
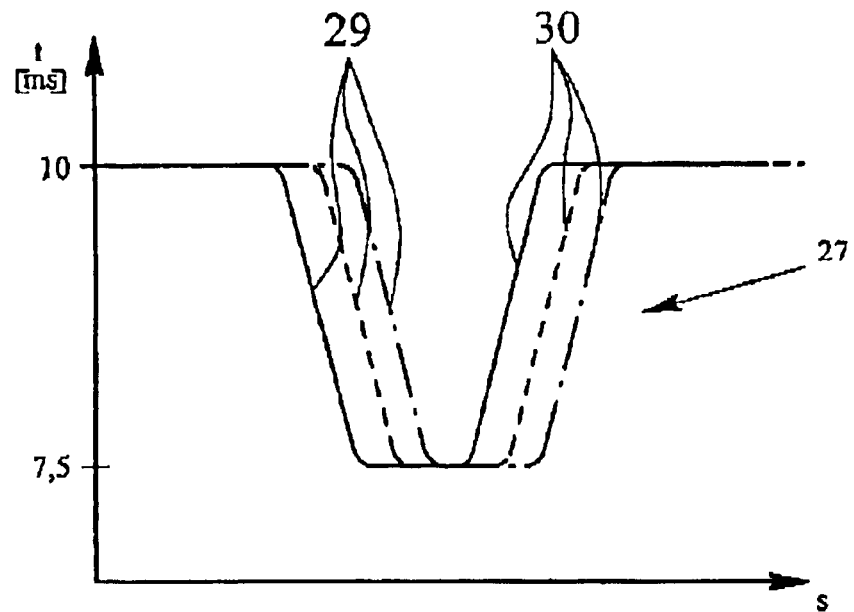

FIG. 9 finally shows measurement curves 26, 27 of the individual coils 4 in which the time t measured by the evaluation unit is plotted as a function of the position s of the influencing element 2 for several coils 4. FIG. 9*a* shows the measurement curves 26 for a rod-shaped influencing element 2 and FIG. 9*b* shows the measurement curves 27 for a disk-shaped influencing element 2. One rod-shaped influencing element 2 for each coil 4 produces only one flank 28 at a time, while a disk-shaped influencing element 2 per coil 4 produced two flanks 29, 30, by which on the one hand more information about the position of the influencing element 2 in the evaluation unit 8 is available, on the other an inductive path sensor 1 with a much shorter structural length can be implemented. It is especially advantageous if the length LBE of the influencing element 2 is chosen such that the influencing element 2 independently of its position always influences at least one coil 4 100%. This is the case when the length LBE of the influencing element 2 satisfies the following equation:

$$L_{BE} n = 2 B_{Sp} + A, \text{ with}$$

$B_{Sp}$—width of one coil 4

A—distance between two coils 4.

The influencing element 2 preferably has a smooth surface and consists of ferrite or a metal.

What is claimed is:

1. An inductive path sensor for determining the position of the influencing element, comprising:
   a plurality of coils arranged in succession,
   at least one capacitor,
   at least one amplifier element,
   at least one changeover switch, and
   an evaluation unit,
   wherein one coil at a time is coupled to one of the at least one capacitor to form an oscillating circuit,
   wherein the oscillating circuit is coupled to the amplifier element to form an oscillator,
   wherein the changeover switch is adapted to select individual coils in the oscillator in succession, and
   wherein the evaluation unit is adapted to measure changes in the impedance of the coil selected by the changeover switch, or of the oscillating circuit of the coil selected by the changeover switch, depending on the position of the influencing element relative to the respective coil.

2. The inductive path sensor as claimed in claim 1, wherein each oscillating circuit has the same identical capacitor and each oscillator has the same identical amplifier element.

3. The inductive path sensor as claimed in claim 2, wherein the evaluation unit measures the change of frequency of each of the plurality of coils, or of each oscillating circuit, depending on the position of the influencing element relative to the respective one of the plurality of coils.

4. The inductive path sensor as claimed in claim 2, wherein there is at least one counter connected to the oscillator and to the evaluation unit, wherein the counter counts the number of oscillations of the oscillator, and wherein the evaluation unit measures the time which passes until the counter has reached a preset value.

5. The inductive path sensor as claimed in claim 2, wherein there is at least one counter connected to the oscillator and to the evaluation unit, the counter counting the number of oscillations of the oscillator during a given time interval, and the evaluation unit evaluating this counted number of oscillation.

6. The inductive path sensor as claimed in claim 4, wherein there is a second counter connected to the first counter and to the changeover switch and the evaluation unit, the second counter generating addresses which are incremented by one at a time, starting with one, and when the first counter has reached the preset value or has counted the given time interval, and wherein the changeover switch being switched by the address produced by the second counter.

7. The inductive path sensor as claimed in claim 2, wherein the evaluation unit measures a change of the amplitude of the each oscillating circuit or oscillator as a function of the position of the influencing element relative to the respective coils.

8. The inductive path sensor as claimed in claim 7, wherein the changeover switch is switched by the evaluation unit.

9. The inductive path sensor as claimed in claim 1, wherein the coils are made as hollow cylindrical coils and the influencing element is located movably along the cylinder axis of the coils.

10. The inductive path sensor as claimed in claim 1, wherein the coils are flat coils etched on a flexible carrier.

11. The inductive path sensor as claimed in claim 10, wherein the flat coils are etched on both sides on the flexible carrier.

12. The inductive path sensor as claimed in claim 1, wherein each of the plurality of coils are decoupled from one another.

13. The inductive path sensor as claimed in claim 12, wherein each of the plurality of coils are separated from one another by short-circuiting rings.

14. The inductive path sensor as claimed in claim 12, wherein each of the plurality of coils are located in a pot-type core, the pot-type cores being open toward the influencing element.

15. The inductive path sensor as claimed in claim 12, wherein the coils are located on a film of a ferrite-polymer composite and are decoupled from one another by the corresponding folding of the film or of foldable areas of the film.

16. The inductive path sensor as claimed in claim 1, wherein the length of the influencing element is chosen such that the influencing element, independently of its position, always influences at least one of the plurality of coils by 100%.

17. The inductive path sensor as claimed in claim 1, wherein the influencing element is disk-shaped.

18. Process for determining the position of an influencing element within a housing, having an inductive path sensor with several successive coils, at least one capacitor, at least one amplifier element, at least one changeover switch, and one evaluation wit, wherein one coil at a time is coupled to the capacitor to form an oscillating circuit, and the oscillating circuit is coupled to the amplifier element to form an oscillator, comprising the steps of:

selecting a coil or an oscillator by using the changeover switch, and measuring the impedance of the each of the coils selected by the changeover switch and of the oscillating circuit selected by the changeover switch by the evaluation unit as a function of the position of the influencing element relative to the coils, wherein said steps are repeated until the impedance of all coils has been measured by the evaluation unit.

19. The process as claimed in claim 18, wherein the evaluation unit measures the change of the frequency of each coil or each oscillating circuit depending on the position of the influencing element relative to the respective coils.

20. The process as claimed in claim 19, wherein the inductive position encoder has a counter which is connected on the one hand to the oscillator and on the other to the evaluation unit, wherein the counter counts in succession the number of oscillations of the oscillator which has just been chosen by the changeover switch, and the evaluation unit measures the time which passes until the counter has reached a preset value.

21. The process as claimed in claim 19, wherein the inductive position encoder has a counter which is connected on the one hand to the oscillator and on the other to the evaluation unit, wherein the counter counts during a given time the number of oscillations of the oscillator which has just been chosen by the changeover switch, and the evaluation unit evaluates this number.

22. The process as claimed in claim 20, wherein the inductive position encoder has a second counter which is connected on the one hand to the first counter and on the other hand to the evaluation unit and the changeover switch, wherein the first counter, when reaching the preset value or after a given time has passed, delivers a pulse to the second counter, the second counter produces addresses which are increased by one each time, starting with one, when the second counter receives the pulse from the first counter, and the changeover switch selects a coil or an oscillator according to the address generated by the second counter.

23. The process as claimed in claim 22, wherein the second counter having several outputs, and wherein the addresses are produced by the second counter in dual code.

24. The process as claimed in claim 20, wherein the evaluation unit takes from the address produced by the second counter, the information as to which coil or which oscillator has just been selected by the changeover switch, and measures the time interval during which the address is present.

25. The process as claimed in claim 22, wherein the evaluation unit measures the time between the high/low signals at the lowest order output.

26. The process as claimed in claim 18, wherein in the calibration process the influencing element is moved over the maximum measurable length of the inductive position encoder and the values are stored as correction and reference values.

* * * * *